(12) United States Patent
Rivers et al.

(10) Patent No.: US 7,273,332 B2
(45) Date of Patent: Sep. 25, 2007

(54) METHOD AND APPARATUS FOR THROUGH-HOLE PLACEMENT IN A BUILDING STRUCTURE

(75) Inventors: Paul Rivers, Cullman, AL (US); Frederick Diggle, III, Mountain Brook, AL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 404 days.

(21) Appl. No.: 10/945,164

(22) Filed: Sep. 20, 2004

(65) Prior Publication Data

US 2006/0062641 A1   Mar. 23, 2006

(51) Int. Cl.
   *B23B 49/00*   (2006.01)
(52) U.S. Cl. .................. 408/1 R; 408/13; 408/16; 408/75; 33/355 R
(58) Field of Classification Search .......... 408/1 R, 408/13, 16, 75, 2, 3; 33/355 R, 1 CC, DIG. 1; 333/DIG. 1
   See application file for complete search history.

(56) References Cited

U.S. PATENT DOCUMENTS

| | | | | |
|---|---|---|---|---|
| 1,971,189 A * | 8/1934 | Leibing | ...... | 324/67 |
| 2,346,773 A * | 4/1944 | McBride et al. | ...... | 324/67 |
| 2,600,857 A * | 6/1952 | De La Mater | ...... | 324/67 |
| 2,782,524 A * | 2/1957 | Vogt | ...... | 33/347 |
| 2,807,780 A * | 9/1957 | Ludwig et al. | ...... | 324/67 |
| 2,844,977 A * | 7/1958 | Morse | ...... | 408/1 R |
| 2,933,679 A * | 4/1960 | Bray | ...... | 324/228 |
| 3,011,369 A * | 12/1961 | Russell | ...... | 408/80 |
| 3,436,155 A * | 4/1969 | Perin, Jr. | ...... | 356/138 |
| 3,845,384 A * | 10/1974 | Stoutenberg et al. | ...... | 324/228 |
| 4,388,890 A * | 6/1983 | Wester et al. | ...... | 116/204 |
| 4,474,513 A * | 10/1984 | Salyers | ...... | 408/110 |
| 4,896,131 A * | 1/1990 | Podlesny et al. | ...... | 335/302 |
| 5,395,188 A * | 3/1995 | Bailey et al. | ...... | 408/127 |
| 5,432,434 A * | 7/1995 | Tugwell | ...... | 324/67 |
| 5,465,500 A * | 11/1995 | Nammoto | ...... | 33/666 |
| 5,888,035 A * | 3/1999 | Cutler | ...... | 408/225 |
| 6,087,824 A * | 7/2000 | Shiao | ...... | 324/67 |
| 6,171,033 B1* | 1/2001 | Wrobel | ...... | 408/239 R |
| 6,229,294 B1* | 5/2001 | Wun | ...... | 324/67 |
| 6,366,073 B1* | 4/2002 | Shiao | ...... | 324/67 |
| 6,452,097 B1* | 9/2002 | DeWall | ...... | 174/58 |
| 6,747,536 B1* | 6/2004 | Miller, Jr. | ...... | 335/285 |
| 6,927,560 B2* | 8/2005 | Pedigo et al. | ...... | 324/67 |

FOREIGN PATENT DOCUMENTS

JP    61125714 A  *  6/1986
JP    62024906 A  *  2/1987

* cited by examiner

*Primary Examiner*—Monica Carter
*Assistant Examiner*—Michael W. Talbot
(74) *Attorney, Agent, or Firm*—Cantor Colburn LLP

(57) ABSTRACT

A method and apparatus for creating a through-hole in a building structure includes selecting a first location on a first side of the building structure that will define a first opening of the through-hole; disposing a magnet at the first location; selecting a second location on a second side opposite the first side via a magnetic pointer magnetically pointing to the magnet; and drilling the through-hole from the second side through the building structure in a direction indicated by the magnetic pointer creating the through-hole defined by the first and second openings on the first and second sides, respectively.

17 Claims, 4 Drawing Sheets

METHOD AND APPARATUS FOR THROUGH-HOLE PLACEMENT IN A BUILDING STRUCTURE

BACKGROUND OF THE INVENTION

The present disclosure relates generally to a method and apparatus for through-hole placement in a building structure, more particularly, to a method and apparatus to locate one end of a desired through-hole from an opposite side of the building structure.

In the telecommunications or electronics industry, it is common practice for a technician to route wires through partitions including walls, floors, and ceilings of a building structure, such as a home or business. Conventional practice provides several approaches that involve drilling holes through the walls, floors, and ceilings when provisioning new wiring. However, when drilling a through-hole through the wall, for example, there is no way to be certain where the drill bit will exit.

Often the technician must accommodate constraints on both sides of the building structure. These constraints include, but are not limited to, customer preferences, studs, gas pipes, water pipes, and power lines, for example. For example, a stud finder may locate a stud behind one wall defining a partition, but is unable to indicate where the drill bit will exit on the other side of the partition. In this manner, a technician can select a suitable drill bit entry hole location on one side of the building structure, but then wonders about the drill bit exit hole location on the other side (e.g., blind side) of the building structure.

Currently, the problem of locating a potential drill bit exit hole on the blind side of the building structure may be done with careful measurements and visual estimation of where the through-hole will enter and exit the building structure. However, visual estimation is often inaccurate and taking measurements is sometimes tedious. Furthermore, both of these methods are time consuming.

Thus, there is a need for a method and apparatus for through-hole placement in a building structure that addresses the above described drawbacks.

SUMMARY

According to exemplary embodiments, the present invention provides a method and apparatus for through-hole placement used in conjunction with routing wires through partition walls including walls, floors, and ceilings of a building structure.

According to exemplary embodiments, the present invention provides a method and apparatus for positively locating both ends defining a potential through-hole before drilling the same.

According to one aspect, an apparatus for determining a location of a through-hole in a building structure includes a magnet disposed at a first location on a first side of the building structure. The first location is selected on the first side of the building structure that will define a first opening of the through-hole. A magnetic pointer is disposed at a second location on a second side opposite the first side in magnetic communication with the magnet. The magnetic pointer is configured to point to the magnet indicating a direction of the through-hole in the building structure defined by a second opening on the second side to the first opening on the first side when the through-hole is drilled.

Another aspect is a method for creating a through-hole in a building structure includes selecting a first location on a first side of the building structure that will define a first opening of the through-hole; disposing a magnet at the first location; selecting a second location on a second side opposite the first side via a magnetic pointer magnetically pointing to the magnet; and drilling the through-hole from the second side through the building structure in a direction indicated by the magnetic pointer creating the through-hole defined by the first and second openings on the first and second sides, respectively.

BRIEF DESCRIPTION OF THE DRAWINGS

Referring to the exemplary drawings wherein like elements are numbered alike in the several FIGURES.

DETAILED DESCRIPTION OF EXEMPLARY EMBODIMENTS OF THE INVENTION

A method and apparatus to locate one end of a desired through-hole from an opposite side of the building structure according to exemplary embodiments of the present invention is used to run wire through a building structure. The apparatus to locate holes on either side of the building structure employs a magnet selectively disposed on a first surface defining the building surface and a magnetic pointer selectively disposed on an opposite second surface. The magnetic pointer is in magnetic communication with the magnet disposed on a blind side or first surface of the building structure pointing to the magnet corresponding to an exit hole to be drilled, while the position of the magnetic pointer corresponds to an entrance hole to be drilled. The magnetic pointer indicates a direction in which to drill through the building structure in order to reach the magnet on the blind side creating the entrance and exit holes for wire to be run therethrough.

Thus, when the magnetic pointer is selectively positioned on the second surface such that the magnetic pointer is substantially normal to the second surface defining the drywall, the entrance and exit holes can be drilled by drilling in a direction substantially normal to the second surface. Moreover, since the magnet was selectively positioned prior to positioning the magnetic pointer, the exit hole is accurately known prior to drilling.

Figure 1:
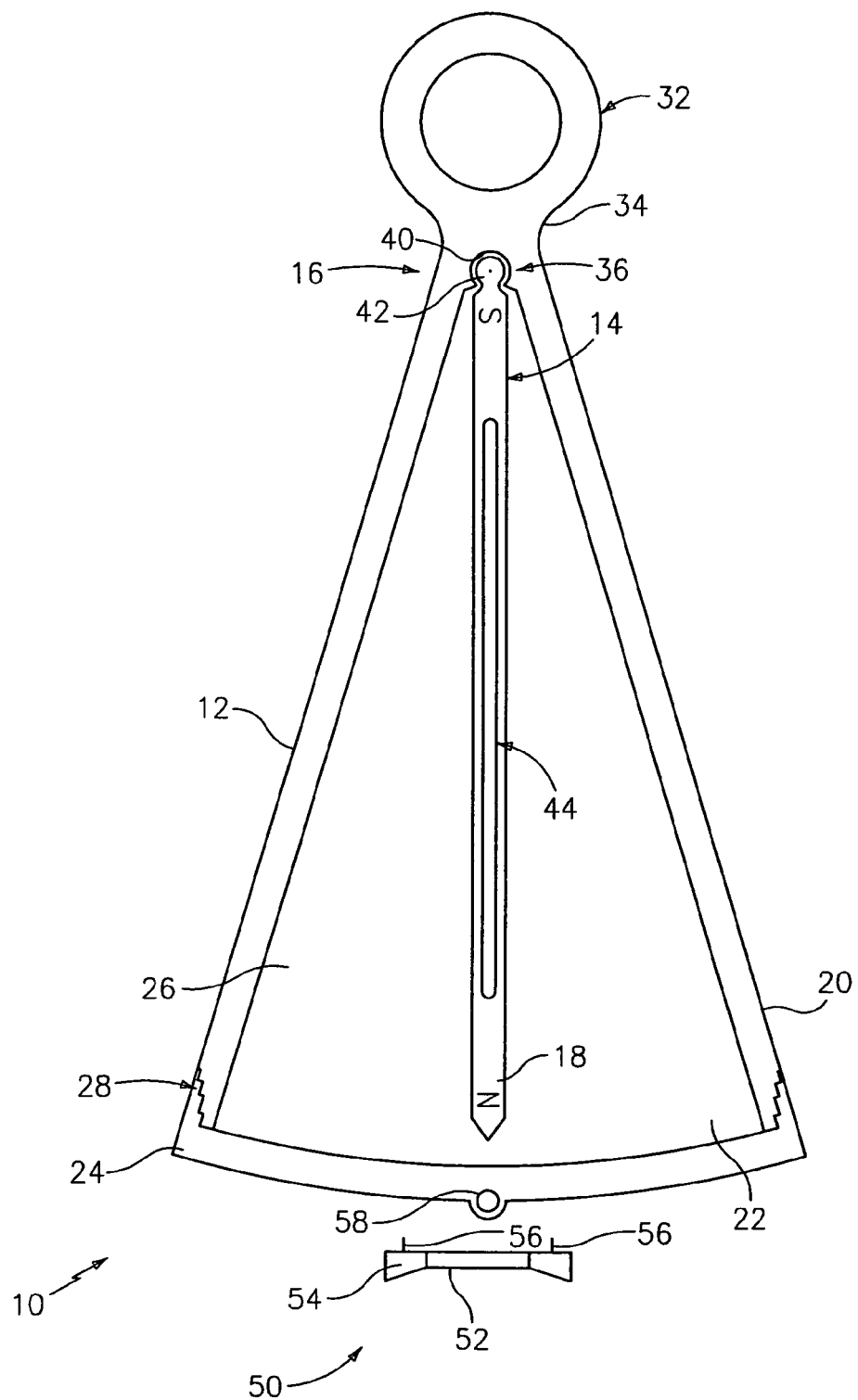
FIG. 1 is a side view of a three dimensional magnetic pointer used in conjunction with a magnet on a blind side of the building structure according to an exemplary embodiment.

FIG. 1 shows a magnetic pointer system according to an exemplary embodiment of the invention. In FIG. 1, a magnetic pointer system 10 includes a fluid filled housing 12 having a magnetic pointer 14 pivotally hinged at a first end 16 defining pointer 14 while an opposite second end 18 is free to pivot in multiple axes.

Housing 12 is configured as a cone 20 having an open end 22 proximate second end 18 of pointer 14, however any suitable geometric shape is contemplated and is not limited to a cone 20. Open end 22 is closed with a circular base 24 to retain a fluid 26 within cone 20 such that second end 18 is free to pivot in multiple axes. In an exemplary embodiment, fluid 26 is a liquid, but fluid 26 may include a gas, including being air filled. In an exemplary embodiment, fluid 26 is relatively viscous liquid such as glycerine or oil. Base 24 and cone 20 may include threads 28 to threadably engage with one another. Alternatively, base 24 may be bonded to cone 20 using an adhesive, for example, but not limited thereto. Cone 20 optionally includes an integrated ring 32, such as a key ring, configured at a tip 34 defining cone 20. In this manner, it is envisioned that a technician may carry pointer 14 in housing 12 on a key chain via key ring 32 extending from housing 12. However, it will be recognized by one skilled in the pertinent art that other attachment devices may be included other than a key ring, including a chain or a carabiner extending from housing 12, for example.

First end 16 of magnetic pointer 14 is pivotally hinged with a ball and socket joint 36. Ball and socket joint 36 is proximate tip 34 of cone 20. A socket 40 is configured proximate tip 34 to pivotally retain a ball 42 configured at first end 16 of pointer 14. In this manner, second 18 of pointer 14 can move in three dimensions or in multiple axes. Unlike a magnetized needle of a conventional compass that rotates in two dimensions or about a plane, ball and socket joint 36 allows three dimensional motion of pointer 14 about ball 42.

Magnetic pointer 14 is magnetized such that first end 16 is a south pole end 16 and opposite second end 18 is a north pole end 18. Intermediate south and north pole ends, 16, 18, respectively, pointer includes an air chamber 44. Air chamber 44 provides buoyancy to pointer 14 such that pointer 14 remains buoyantly neutral in fluid 26.

Figure 2:
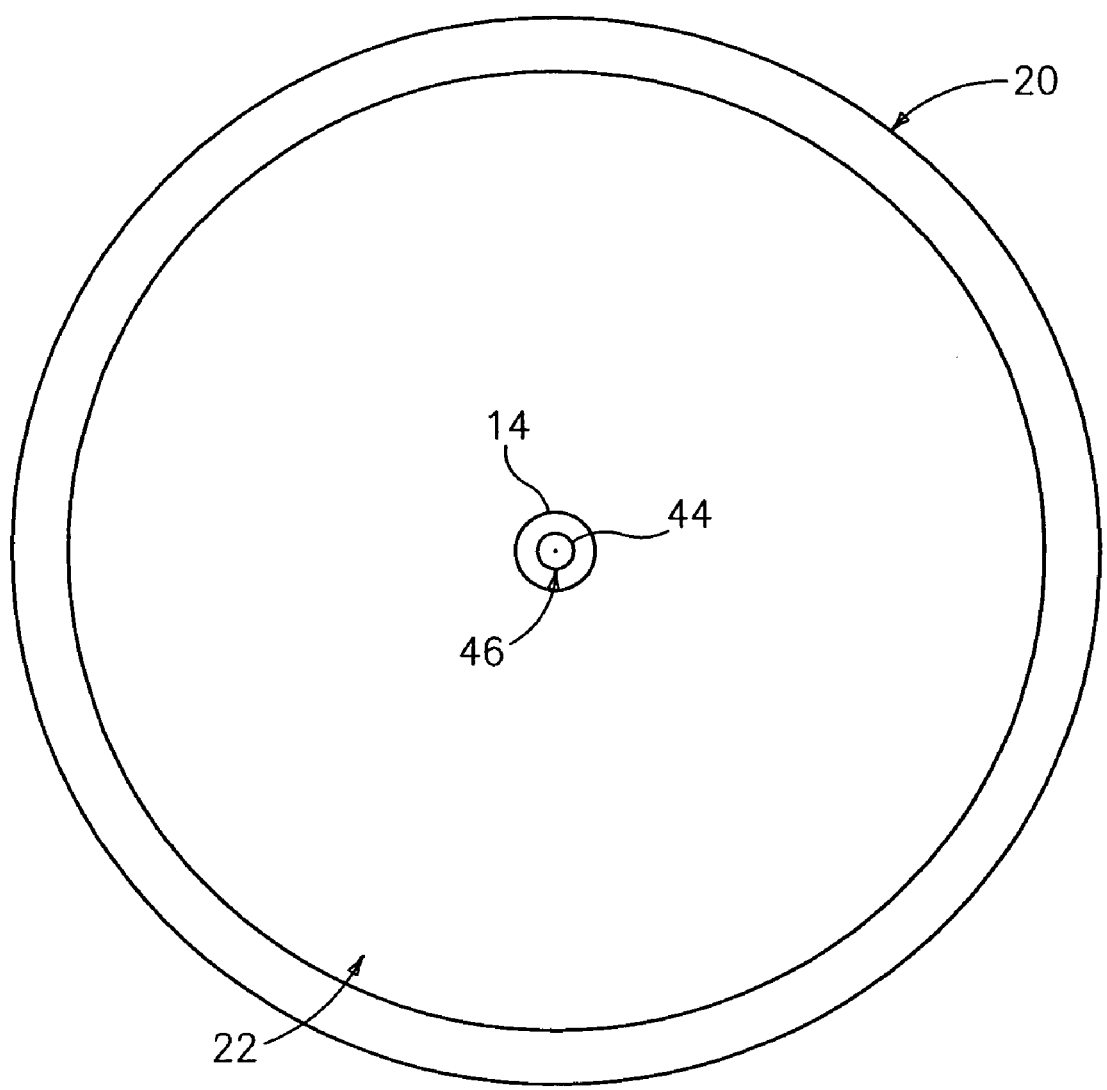
FIG. 2 is a bottom end view of the three dimensional magnetic pointer of FIG. 1 used in conjunction with a magnet on a blind side of the building structure according to an exemplary embodiment.

FIG. 2 illustrates open end 22 of cone 20 with base 24 removed. Magnetic pointer 14 is shown in a buoyantly neutral position with a tip 46 defining a terminal end of north pole end 18 located in a center of cone 20.

Referring again to FIG. 1, magnetic pointer system 10 includes a magnet assembly 50 in magnetic communication with pointer 14. Magnet assembly 50 includes a magnet 52 encased in a plastic housing 54 having a means for releasable fastening with a building structure. In one embodiment, the means for releasable fastening with a building structure includes pins 56 extending from plastic housing 54 configured to penetrate drywall or gypsum board and releasably retain magnet assembly 50 on vertically or horizontally hung drywall without causing aesthetic damage thereto. However, other releasable fastening means are contemplated including, but not limited to, an adhesive or adhesive tape, for example.

In an exemplary embodiment, magnet 52 is a neodymium (NIB) magnet having a strength of about 38 MegeGauss Oersted (MGO) (e.g., grade N38). Further, magnet 52 includes dimensions of about 1 inch in diameter and about 0.5 inch thick, however, other dimensions are contemplated suitable to the desired end purpose. Using this type of magnet 52, it has been found that magnetized pointer 14 can consistently locate magnet 52, via magnetic communication, through all types of walls when magnet 52 is within about ten inches of base 24 disposed on an opposite side of the wall.

Circular base 24 optionally includes an alignment mark 58 disposed at a center defining base 24 and corresponding to a buoyantly neutral position of pointer 14 illustrated in FIG. 2. In this manner, when housing 12 is a clear plastic or other transparent material (e.g., glass), alignment mark 58 aids alignment of pointer tip 46 with alignment mark 58 for selecting an entrance drill hole discussed more fully below.

Figure 3:
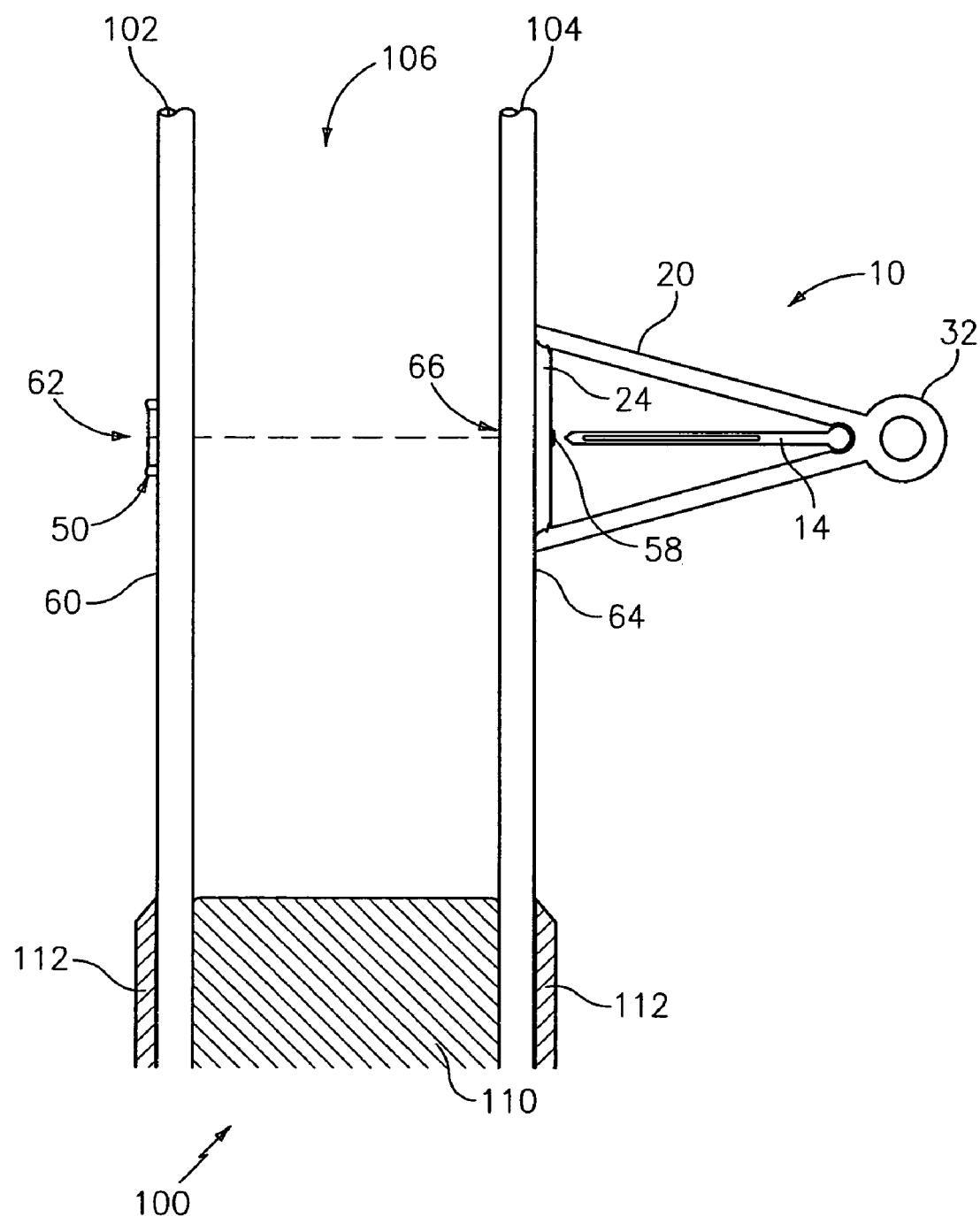
FIG. 3 is a cross section view through a wall defined by a pair of drywall surfaces with a magnet on a first drywall surface and a magnetic pointer on a second drywall surface pointing to the magnet of the first drywall surface according to an exemplary embodiment.

Referring now to FIG. 3, magnetic pointer system 10 is illustrated with magnet assembly 50 disposed on a first surface 60 defining building structure 100 corresponding to an exit hole location 62. Circular base 24 is disposed on an opposite second surface 64 defining building structure 100 corresponding to an entry hole location 66. Building structure 100 as illustrated is an interior wall 100 defined by a first drywall or gypsum board 102 and a second drywall or gypsum board 104 defining an air space 106 therebetween. Air space 106 is defined by a width of framing lumber 110 disposed between first and second drywalls 102, 104, respectively. In one embodiment, air gap 106 is about 3.5 inches corresponding to a width of 2×4 lumber. First and second surfaces 60 and 64, respectively, each have respective base board molding 112 disposed on lower portions thereof attached to lumber 110 using finishing nails (not shown) or other fastening means, as is known in the art.

First, a technician places magnet assembly 50 on first surface 60 of drywall 102 that is selected to be a good location corresponding to an exit hole location 62. Next, the technician goes to an opposite side of the partition wall 100 and uses pointer 14 to locate magnet 52 via magnetic communication through wall 100 to confirm that a location of alignment mark 58 is suitable as an entrance hole location 66 on the second drywall 104. More specifically, pointer 14 points to magnet 52 on a blind side of wall 100 indicating a direction in which to drill from second surface 64 to reach magnet 52.

In an exemplary embodiment, entrance hole location 66 on second surface 64 is selected when magnetic pointer 14 is substantially normal to second surface 62 or when tip 46 is aligned with alignment mark 58 indicating a location for drilling an entrance hole. In this manner, pointer 14 indicates that selected entrance and exit hole locations 62 and 66, respectively, are aligned having an axis substantially normal to surfaces 60 and 62 defining wall 100.

In an exemplary embodiment, a technician locates magnet 52 on one side of the partition and then marks the location of entry hole on the other side of the partition. The technician then drills substantially perpendicular to the wall toward the magnet 52. The magnet 52 is made robust enough such that when the tip of the rotating drill bit hits the magnet, the drill bit knocks the magnet 52 off the wall without damage to the magnet.

Figure 4:
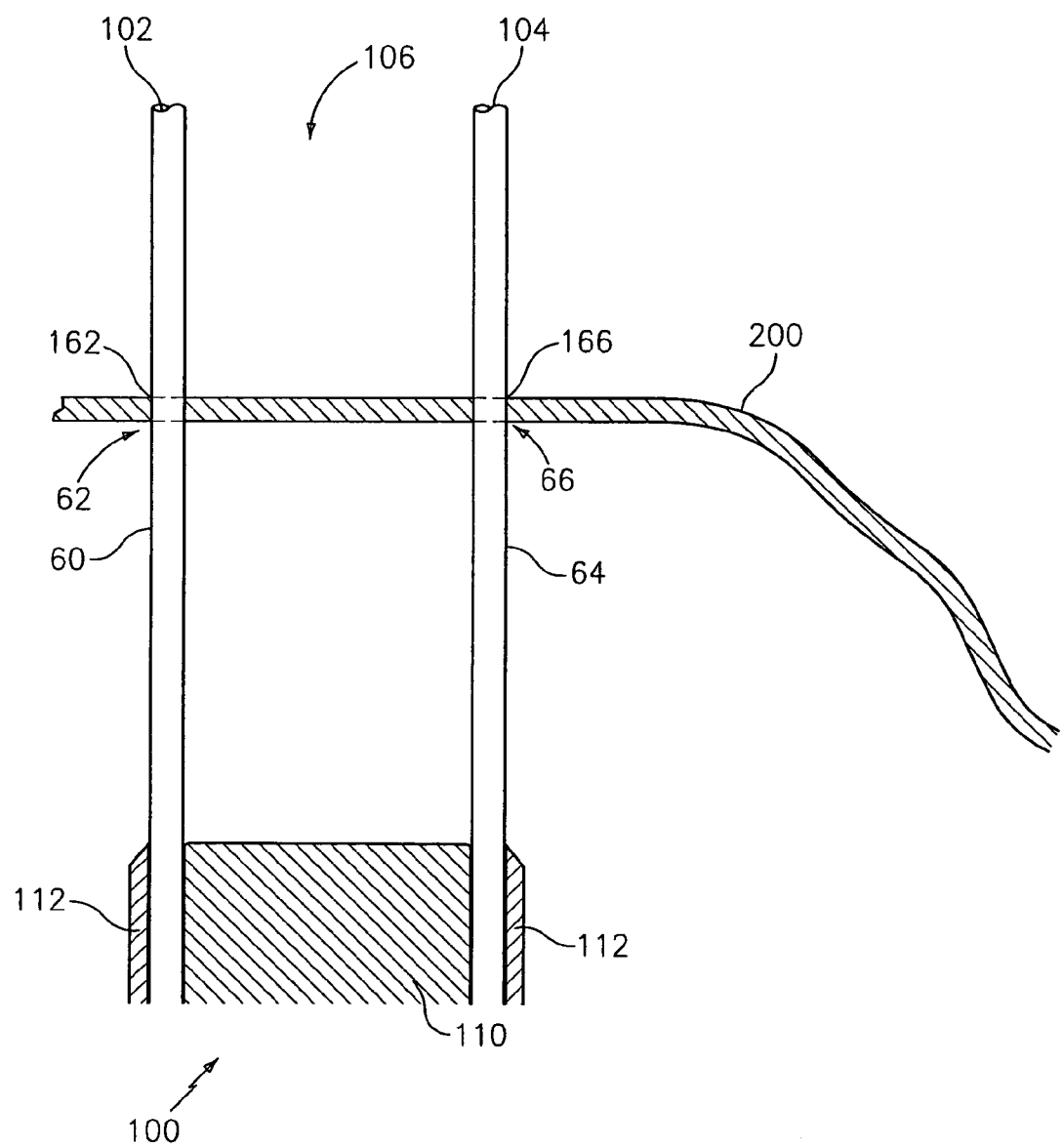
FIG. 4 is a cross section view of the wall of FIG. 3 illustrating holes cut through each of the pair of drywall surfaces to receive a wire therethaccording to an exemplary embodiment.

FIG. 4 illustrates holes 16 and 166 at hole locations 62 and 66, respectively. After hole locations 62 and 66 are identified, a suitably sized drill bit (not shown) is used to form holes 162 and 166. A wire 200, such as a telecommunications wire, is then able to pass through wall 100 via holes 162 and 166. It will be recognized by one skilled in the pertinent art that although the above discussed partition has been described with reference to a wall, a floor or ceiling partition is also contemplated, including exterior and interior partition walls.

According to the exemplary embodiments of the invention, using a magnet on one side of a partition where an optimal exit hole location is selected and then locating the magnet from an opposite side of the partition to confirm an entry hole location eliminates visual estimation and tedious measurements on either side of the partition. Further, location of the magnet allows quick and accurate location of a drill bit exit point that allows a technician to initiate drilling at a selected entry hole location on the other side after confirming this entry drill bit location is suitable without going back to the other side.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of creating a through-hole in a building structure, the method comprising:
    selecting a first location on a first side of the building structure that will define a first opening of the through-hole;
    disposing a magnet at said first location;
    second side selecting a second location on a second side opposite said first side via a magnetic pointer magnetically pointing to said magnet, wherein said magnetic pointer is normal to said second side; and
    drilling the through-hole from said second side through the building structure in a direction indicated by said magnetic pointer creating the through-hole defined by said first and second openings on said first and second sides, respectively;
    wherein said magnetic pointer includes:
    a housing retaining a fluid therein; and
    a magnetized elongated member defined by a north pole end and a south pole end, said south pole end being pivotally hinged within said housing allowing multi-axial movement of said elongated member;
    wherein said fluid is a liquid.

2. The method of claim 1, wherein said housing includes a socket configured to pivotally retain a ball configured in said south pole end.

3. The method of claim 2, wherein said housing is configured as a transparent cone and a circular base closing a cavity defined by said cone, said socket being disposed in said housing opposite said base.

4. The method of claim 3, wherein said housing includes a ring disposed at a tip defining said cone opposite said base.

5. The method of claim 3, wherein said base is one of threadably engaged and bonded with said cone to seal an opening defining said cone.

6. The method of claim 1, wherein said building structure is one of a wall, floor and ceiling.

7. A method of creating a through-hole in a building structure, the method comprising:
    selecting a first location on a first side of the building structure that will define a first opening of the through-hole;
    disposing a magnet at said first location;
    selecting a second location on a second side opposite said first side via a magnetic pointer magnetically pointing to said magnet, wherein said magnetic pointer is normal to said second side; and
    drilling the through-hole from said second side through the building structure in a direction indicated by said magnetic pointer creating the through-hole defined by said first and second openings on said first and second sides respectively;
    wherein said magnetic pointer includes:
    a housing retaining a fluid therein; and
    a magnetized elongated member defined by a north pole end and a south pole end; said south pole end being pivotally hinged within said housing allowing multi-axial movement of said elongated member,
    wherein an intermediate portion defining said elongated member includes an air chamber configured therein providing buoyancy of said elongated member in said fluid.

8. A method of creating a through-hole in a building structure, the method comprising:
    selecting a first location on a first side of the building structure that will define a first opening of the through-hole;
    disposing a magnet at said first location;
    selecting a second location on a second side opposite said first side via a magnetic pointer magnetically pointing to said magnet, wherein said magnetic pointer is normal to said second side; and
    drilling the through-hole from said second side through the building structure in a direction indicated by said magnetic pointer creating the through-hole defined by said first and second openings on said first and second sides, respectively;
    wherein said magnetic pointer includes:
    a housing retaining a fluid therein; and a magnetized elongated member defined by a north pole end and a south pole end, said south pole end being pivotally hinged within said housing allowing multiaxial movement of said elongated member;
    wherein said housing includes a socket configured to pivotally retain a ball configured in said south pole end;
    wherein said housing is configured as a transparent cone and a circular base closing a cavity defined by said cone, said socket being disposed in said housing opposite said base;
    wherein said base includes an alignment mark disposed at a center defining said circular base, said alignment mark configured to visually align said alignment mark with said north pole end.

9. An apparatus for determining a location of a through-hole in a building structure comprising:
    a magnet disposed at a first location on a first side of the building structure, said first location selected on said first side of the building structure, that will define a first opening of the through-hole; and
    a magnetic pointer disposed at a second location on a second side opposite said first side in magnetic communication with said magnet, said magnet pointer being configured to point to said magnet indicating a direction of the through-hole in the building structure defined by a second opening on said second side to said first opening on said first side when the through-hole is drilled;
    wherein said magnetic pointer includes:
    a housing retaining a fluid therein; and
    magnetized elongated member defined by a north pole end and a south pole end, said south pole end being pivotally hinged within said housing allowing multi-axial movement of said elongated member;
    wherein said fluid is a liquid.

10. The apparatus of claim 9, wherein said second location is selected when said magnetic pointer is normal to said second side.

11. The apparatus of claim 9, wherein said housing includes a socket configured to pivotally retain a ball configured in said south pole end.

12. The apparatus of claim 11, wherein said housing is configured as a transparent cone and a circular base closing a cavity defined by said cone, said socket being disposed in said housing opposite said base.

13. The apparatus of claim 12, wherein said housing includes a ring disposed at a tip defining said cone opposite said base.

14. The apparatus of claim 12, wherein said base is one of threadably engaged and bonded with said cone to seal an opening defining said cone.

15. The apparatus of claim 9, wherein said building structure is one of a wall, floor and ceiling.

16. An apparatus for determining a location of a through-hole in a building structure comprising:

a magnet disposed at a first location on a first side of the building structure, said first location selected on said first side of the building structure that will define a first opening of the through-hole; and a magnetic pointer disposed at a second location on a second side opposite said first side in magnetic communication with said magnet, said magnet pointer being configured to point to said magnet indicating a direction of the through-hole in the building structure defined by a second opening on said second side to said first opening on said first side when the through-hole is drilled;

wherein said magnetic pointer includes;

a housing retaining a fluid therein; and a magnetized elongated member defined by a north pole end and a south pole end, said south pole end being pivotally hinged with said housing allowing multiaxial movement of said elongated member;

wherein an intermediate portion defining said elongated member includes an air chamber configured therein providing buoyancy of said elongated member in said fluid.

17. An apparatus for determining a location of a through-hole in a building structure comprising:

a magnet disposed at a firs location on a first side of the building structure, said first location selected on said first side of the building structure that will define a first opening of the through-hole; and a magnetic pointer disposed at a second location on a second side opposite said first side in magnetic communication with said magnet, said magnet pointer being configured to point to said magnet indicating a direction of the through-hole in the building structure defined by a second opening on said second side to said first opening on said first side when the through-hole is drilled;

wherein said magnetic pointer includes;

a housing retaining a fluid therein; and a magnetized elongated member defined by a north pole end and a south pole end, said south pole end being pivotally hinged within said housing allowing multi-axial movement of said elongated member;

wherein said housing includes a socket configured to pivotally retain a ball configured in said south pole end;

wherein said housing is configured as a transparent cone and a circular base closing a cavity defined by said cone, said socket being disposed in said housing opposite said base;

wherein said base includes an alignment mark disposed at a center defining said circular base, said alignment mark configured to visually align said alignment mark with said north pole end.

\* \* \* \* \*